(12) United States Patent
Chakrabarti et al.

(10) Patent No.: US 7,821,980 B2
(45) Date of Patent: Oct. 26, 2010

(54) VARIABLE RATE SOFT INFORMATION FORWARDING

(75) Inventors: Arnab Chakrabarti, Houston, TX (US); Alexandre de Baynast, Houston, TX (US); Ashutosh Sabharwal, Houston, TX (US); Behnaam Aazhang, Houston, TX (US)

(73) Assignee: Nokia Corporation (FI)

( * ) Notice: Subject to any disclaimer, the term of this patent is extended or adjusted under 35 U.S.C. 154(b) by 543 days.

(21) Appl. No.: 11/498,272

(22) Filed: Aug. 3, 2006

(65) Prior Publication Data

US 2008/0052608 A1    Feb. 28, 2008

(51) Int. Cl.
   *H04B 7/14*    (2006.01)
   *H04J 1/10*    (2006.01)
   *H04J 3/08*    (2006.01)
   *G01R 31/08*   (2006.01)
   *H04L 1/00*    (2006.01)

(52) U.S. Cl. ..................... 370/315; 370/252
(58) Field of Classification Search ............... 370/400, 370/467, 315, 328, 254, 338, 318, 252; 455/67.13, 455/7, 11.1, 13.1
   See application file for complete search history.

(56) References Cited

U.S. PATENT DOCUMENTS 7,634,018 B2 * 12/2009 Lozhkin .................. 375/267

| 2005/0265387 A1* | 12/2005 | Khojastepour et al. ...... 370/467 |
| 2006/0020869 A1* | 1/2006 | Desai et al. ................. 714/752 |
| 2006/0050655 A1* | 3/2006 | Shi et al. .................... 370/254 |
| 2006/0056338 A1* | 3/2006 | Abe et al. ................... 370/328 |
| 2007/0054621 A1* | 3/2007 | Larsson .................... 455/67.11 |
| 2007/0149135 A1* | 6/2007 | Larsson et al. ........... 455/67.13 |
| 2007/0297498 A1* | 12/2007 | Kramer ..................... 375/211 |

FOREIGN PATENT DOCUMENTS

WO    2005/062494    7/2005

OTHER PUBLICATIONS

Sneessens, Harold H., et al. "*Soft Decode and Forward Improves Cooperative Communications,*" Nov. 2005, pp. 157-160.

Dong, Bo, et al. "*LDPS-based Distributed Space Time Cooperative Systems with Non-regenerative Relays*", Oct. 28-Nov. 1, 2005, pp. 1419-1423.

(Continued)

*Primary Examiner*—Ayaz R Sheikh
*Assistant Examiner*—Hoang-Chuong Q Vu
(74) *Attorney, Agent, or Firm*—Mintz Levin Cohn Ferris Glovsky and Popeo, P.C.

(57) ABSTRACT

A method including transmitting a binary vector from a source node to a relay node and receiving a signal vector at the relay node. The method also includes compressing the signal at the relay node by multiplying the signal with a matrix using probabilities and converting output probabilities from the multiplying into retransmission signal amplitudes, the signal amplitude depending not only on a probability of a bit but on a transmission power constraint at the relay node. The method also includes transmitting, by the relay node, estimates of information from the source node to a destination node.

14 Claims, 4 Drawing Sheets

OTHER PUBLICATIONS

International search report PCT/IB2007/001496 filed Jun. 6, 2007.
Notification of the first Office Action dated Nov. 27, 2009, issued by the Patent Office of the People's Republic of China, issued in connection with counterpart Chinese application No. 200710136098.3.

Sneessens et al., "Soft Decode and Forward Improves Cooperative Communications", 1$^{st}$ IEEE International Workshop on Computational Advances in Multi-Sensor Adaptive Processing, pp. 157-160, Dec. 2005.

* cited by examiner

VARIABLE RATE SOFT INFORMATION FORWARDING

BACKGROUND OF THE INVENTION

1. Field of the Invention

The present invention is related to compress-and-forward relaying where a relay node is unable to decode information forwarded by a source node but the relay node estimates what the source node might have sent and forwards this estimate to a destination node.

2. Description of the Related Art

The need for soft information forwarding arises in some practical scenarios, all of which are characterized by the property of forwarding information with unknown reliability. This may happen when the received information is received at a relay node over a noisy channel, when the received information is uncoded and/or the received information is coded at a rate higher than the capacity of a receiving channel. In such scenarios, converting the received soft information to hard information leads to error propagation. Thus, there is a need for an intermediate/relay node to directly process the received soft information probabilistically to produce soft signal values for retransmission and for a system and method of compressing and forwarding soft information without decoding the information.

SUMMARY OF THE INVENTION

According to an embodiment of the present invention, there is provided a method including transmitting a binary vector from a source node to a relay node and receiving a signal vector at the relay node. The method also includes compressing the signal at the relay node by multiplying the signal with a matrix using probabilities and converting output probabilities from the multiplying into retransmission signal amplitudes, the signal amplitude depending not only on a probability of a bit but on a transmission power constraint at the relay node. The method further includes transmitting, by the relay node, estimates of information from the source node to a destination node.

According to an embodiment of the present invention, there is provided an apparatus which includes a transmitting unit configured to transmit a binary vector from a source node to a relay node and a receiving unit configured to receive a signal vector at the relay node. The apparatus also includes a compressing unit configured to compress the signal at the relay node by multiplying the signal with a matrix using probabilities and a converting unit configured to convert output probabilities from the multiplying into retransmission signal amplitudes, the signal amplitude depending not only on a probability of a bit but on a transmission power constraint at the relay node. The apparatus further includes a transmitting unit configured to transmit estimates of information from the source node to a destination node.

According to an embodiment of the present invention, there is provided an apparatus which includes transmitting means for transmitting a binary vector from a source node to a relay node and receiving means for receiving a signal vector at the relay node. The apparatus also includes compressing means for compressing the signal at the relay node by multiplying the signal with a matrix using probabilities and converting means for converting output probabilities from the multiplying into retransmission signal amplitudes, the signal amplitude depending not only on a probability of a bit but on a transmission power constraint at the relay node. The apparatus further includes transmitting means for transmitting estimates of information from the source node to a destination node.

Another embodiment of the invention relates to a relay node that includes a receiving unit configured to receive a signal vector from a source node and a compressing unit configured to compress the signal by multiplying the signal with a matrix using probabilities. The relay node also includes a converting unit configured to convert output probabilities from the multiplying into retransmission signal amplitudes, the signal amplitudes depending not only on a probability of a bit but on a transmission power constraint at the relay node and a transmitting unit configured to transmit estimates of information from the source node to a destination node.

BRIEF DESCRIPTION OF THE DRAWINGS

The accompanying drawings, which are included to provide a further understanding of the invention and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings. An embodiment of the present invention relates to a system for forwarding soft information at an intermediate communication node in a communication chain. The information being forwarded is received from an earlier node in the chain.

Figure 1:
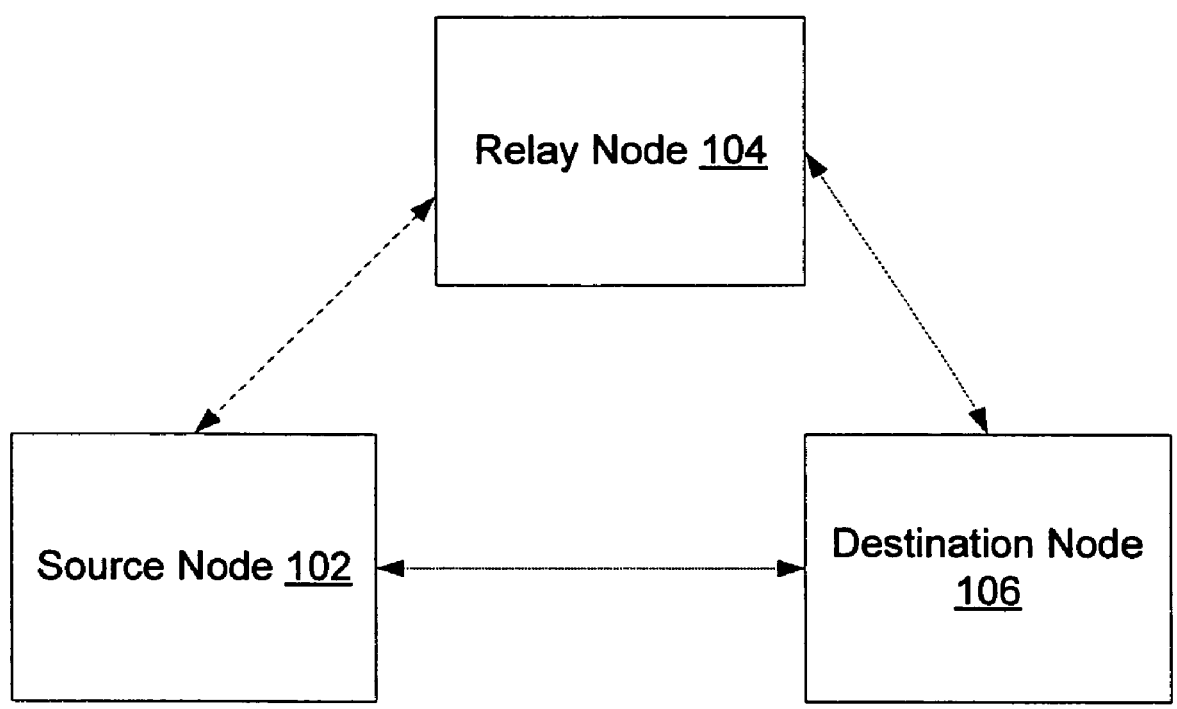
FIG. 1 illustrates a relay channel that implements an embodiment of the invention.

FIG. 1 illustrates a relay channel that implements an embodiment of the invention. As illustrated in FIG. 1, the relay channel includes a source node 102, a relay node 104 and a destination node 106. All information originates at source node 102 and must travel to destination node 106. In a wireless channel, information sent from source node 102 to destination node 106 can be overheard by relay node 104 which relays/forwards the information to destination node 106. As is known to those skilled in the art, relaying yields significantly improved throughput and reliability for the same total power consumption.

Based on the nature of processing performed at relay node 104, several relay protocols are defined. Specifically, a decode-and-forward protocol is defined where relay node 104 decodes its received signal and then transmits a signal that is derived from the decoded information. An amplify-and-forward protocol is also defined where relay node 104 scales the soft signal received from source node 102 and re-transmits it to destination node 106. A compress-and-forward protocol is also defined where relay node 104 is unable to decode the received signal but relay node 104 estimates what source node 102 might have sent and forwards the estimate to destination node 106. As is known to one skilled in the art, the compress-and-forward protocol is also known as estimate-and-forward protocol or quantize-and-forward protocol.

Compress-and-forward relaying yields the highest rates achievable by any protocol in a certain class of scenarios. For example, if a link between source node 102 and relay node 104 has a noise variance that is slightly worse than that of a link between source node 102 and destination node 106, destination node 106 will be able to decode the information from source node 102 with greater reliability than relay node 104. Thus, it is not useful for relay node 104 to decode information and prior to sending the decoded information to destination node 106. However, if soft information received at relay node 104 could be combined with information at destination node, as is done in a maximal-ratio combiner, then the decoding performance would certainly improve. The amplify-and-forward protocol tries to achieve this by enabling relay node 104 to amplify received signals and to forward the amplified signals to destination node 106. The amplify-and-forward protocol is optimal when the link between relay node 104 and destination node 106 is noiseless. However, when the link between relay node 104 and destination node 106 is noisy, there is a cost attached with the amount of information transmitted to destination node 106, and consequently, it is useful to have control over the amount of information being forwarded to destination node 106. Therefore, instead of sending all the soft information as in the amplify-and-forward protocol, a compressed version of the soft information is sent from relay node 104 to destination node 106 in the compress-and-forward protocol.

In an embodiment of the invention, if source node 102 transmits a binary information vector:

$$\hat{X} = [\hat{x}_1 \hat{x}_2 \ldots \hat{x}_m]^T, \text{ where } \hat{x}_1 \in \{0,1\} \quad \text{(equation 1)}$$

in the form of a BPSK signal vector:

$$X = [x_1 x_2 \ldots x_m]^T, \text{ where } x_1 = 2\hat{x}_i - 1 \quad \text{(equation 2)}$$

The received signal vector at the relay is of the form:

$$Y = [y_1 y_2 \ldots y_m]^T, \text{ where } y_i = x_i + n_i; \, i=1,2, \ldots m, \quad \text{(equation 3)}$$

and $n_i$ represents additive noise, which may nominally assume to be zero mean Gaussian with variance $\sigma^2$. The result of compression at relay node 104 is a signal $$W = [w_1 w_2 \ldots w_k]^T, \text{ for some } k < m \quad \text{(equation 4)}$$

An embodiment of the present invention provides an effective method for obtaining W from Y. For example, if source node 102 transmits the information vector:

$$\hat{X} = [0\,0\,0\,0\,0\,0\,0\,0\,0\,0]^T \quad \text{(equation 5)}$$

or equivalently a signal vector:

$$X = [-1\,-1\,-1\,-1\,-1\,-1\,-1\,-1\,-1\,-1] \quad \text{(equation 6)}$$

and relay node 104 receives the signal vector:

$$Y = [0.8366\,-1.1443\,-0.4740\,-1.0223\,-1.1819$$
$$-0.1678\,-0.4120\,-0.7091\,0.0711\,-101257] \quad \text{(equation 7)}$$

due to addition of zero mean Gaussian noise with variance $\sigma^2 = 0.5$. The received signal vector Y is then thresholded to yield:

$$Y = [0\,0\,0\,0\,0\,0\,0\,0\,1\,0]^T \quad \text{(equation 8)}$$

Compression is achieved by multiplying Y with a matrix:

$$M = \begin{bmatrix} 1111110000 \\ 1110001110 \\ 1001011101 \\ 0100110111 \\ 0011101011 \end{bmatrix}$$

The result of the compression is:

$$W = MY = [01011]^T \quad \text{(equation 9)}$$

which differs from the correct value of:

$$MX = [00000]^T \quad \text{(equation 10)}$$

in three out of five positions. It should be obvious to one skilled in the art from the above example that even a single bit error in a received codeword can propagate into many errors in this form of compression. To ameliorate this situation, in an embodiment of the present invention compression is performed using soft information. An embodiment of the invention can still use the binary matrix M for compression, but the matrix multiplication will use probabilities.

Figure 2:
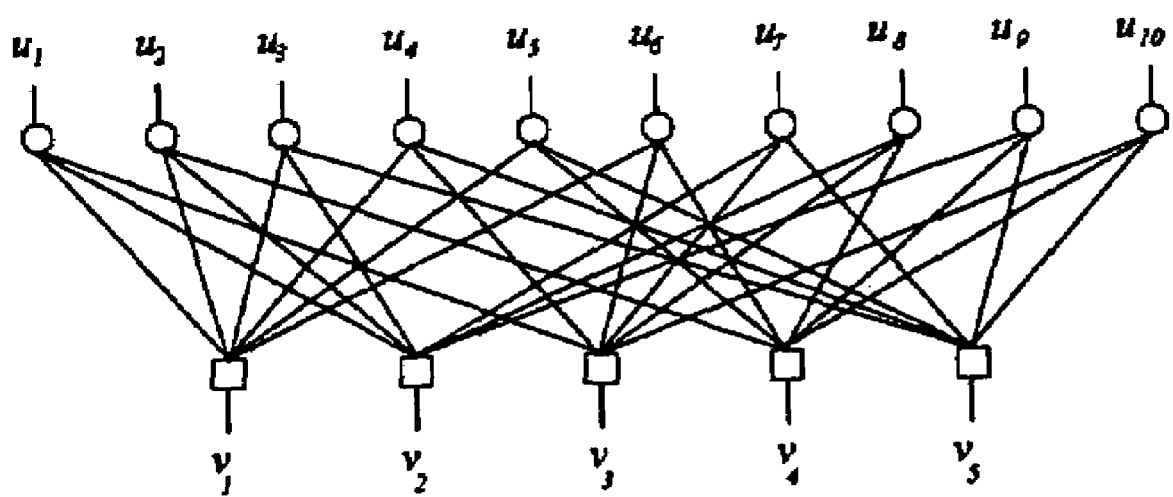
FIG. 2 illustrates a factor graph for viewing a compression matrix as a graph.

FIG. 2 illustrates a factor graph for viewing the matrix as a graph. A column of the matrix M is represented by a variable node, which is illustrated as a circle in the graph. Similarly, a row of M is represented by a check node, which is illustrated as a square. As shown in FIG. 2, there is a connection between a check node and a variable node, if and only if, matrix M has 1 in the corresponding row and column.

In an embodiment of the invention, input probabilities $u_i$ and the posteriori probabilities $p(X_i=1|Y_i=y_i)$, instead of bits, are used as inputs. For notational convenience, $S_j$ is defined as the set of column positions that have a 1 in the $j^{th}$ row of M. In the case of binary inputs, the $j^{th}$ output bit is the result of EXORing input bits at positions indexed by $S_j$. Now, the output $v_j$ is the probability that the $j^{th}$ output bit will be 1 based on the input probabilities $u_i$. In the factor graph of M, the variable nodes indexed by $S_j$ are connected to the $j^{th}$ check node. Thereafter, the dependence of $u_i$ on the channel outputs $y_i$ is characterized, and more importantly the dependence of output probabilities $v_j$ on the values of input probabilities $u_i$ is characterized. The dependence of $u_i$ on $y_i$ can be obtained by a simply application of Bayes theorem as:

$$u_i = p(X_i = 1|Y_i = y_i), \quad \text{(equation 11)}$$

$$= \frac{p(Y_i = y_i|\hat{Y}_i = 1)p(X_i = 1)}{p(Y_i = y_i|(X_i = 1)p((X_i = 1) + p(Y_i = y_i|(X_i = -1)p((X_i = -1)},$$

$$= \frac{\frac{1}{\sqrt{2\pi\delta^2}}e^{-\frac{(y_i-1)^2}{2\delta^2}}}{\frac{1}{\sqrt{2\pi\delta^2}}e^{-\frac{(y_i-1)^2}{2\delta^2}} + \frac{1}{\sqrt{2\pi\delta^2}}e^{-\frac{(y_i+1)^2}{2\delta^2}}} \quad \text{(equation 12)}$$

$$= \frac{1}{1 + e^{-\frac{2y_i}{\delta^2}}}, \quad \text{(equation 13)}$$

assuming that Xi can be 1 or −1 with equal probability.

It should be noted that the above equations adhere to the convention that variables are denoted by upper case, such as $X_i$, and their values are denoted by lower case alphabets, such as $x_i$. For the computation of $v_j$, the probability that the output bit is 1 under modulo 2 arithmetic is the same as the probability that the sum is odd under simple addition. To compute the output probability, the following lemma, as shown in FIG. 14, from equation 3 is used.

Considering a sequence of m independent binary digits in which the $l^{th}$ digit is 1 th probability $p_l$, then the probability that an even number of digits is 1 is:

$$1 = \frac{\prod_{l=1}^{m}(1-2p_l)}{2} \quad \text{(equation 14)}$$

As a consequence of the above lemma, $$v_j = p(\hat{W}_j = 1 | U_1 = u_1, U_2 = u_2, \ldots, U_m = u_m) \quad \text{(equation 15)}$$
$$= \frac{1 - \prod_{i \in S_j}(1-2u_i)}{2}$$

For retransmission by relay node 104, the output probabilities $v_j$ is converted into retransmission signal amplitudes $w_j$. These signal amplitudes depend not only on the probability of the bit, but also on the transmission power constraint at relay node 104.

$$w_j = \frac{\delta_r^2}{2}\ln\left(\frac{1}{v_j}-1\right), \quad \text{(equation 16)}$$

where $\delta_r^2$ characterizes the power with which the compressed signal is retransmitted.

The advantage of soft information processing is that it substitutes making a wrong decision and propagating it at relay node 104 with postponing making the decision until additional information is available at destination node. Using soft information processing, the noisy vector Y of equation 7 is processed to yield posteriori probabilities: U=[3.0340 0.0102 0.1306 0.0165 0.0088 0.3383 0.1614 0.0554 0.5706 0.0110], which are compressed to yield output symbol probabilities V=[0.3963 0.5287 0.4141 0.5191 0.5328]

Note that $\hat{W}$ of equation 9 can be obtained by thresholding V into zeros and ones based on whether the probability is less or more than 0.5. An embodiment of the present invention, however, seeks to avoid making hard decisions at relay node 104. The fact that the second, fourth and fifth probabilities are very close to 0.5 indicates significant uncertainty which can be accounted for at destination node 106 during decoding. Sending hard decisions is more misleading here. Combined with additional information at destination node 106, the probabilities V conveyed through W can facilitate successful decoding.

The above techniques using probabilities naturally extend to higher order modulation schemes. The computation of parity also does not have to be performed in GF(2). The parity symbols can be computed using any function for which it is possible to compute the probability of the output symbols given the input of soft information. Thus, embodiments of the present invention are applicable to virtually all know coding frameworks, including block and convolutional codes.

Figure 3:
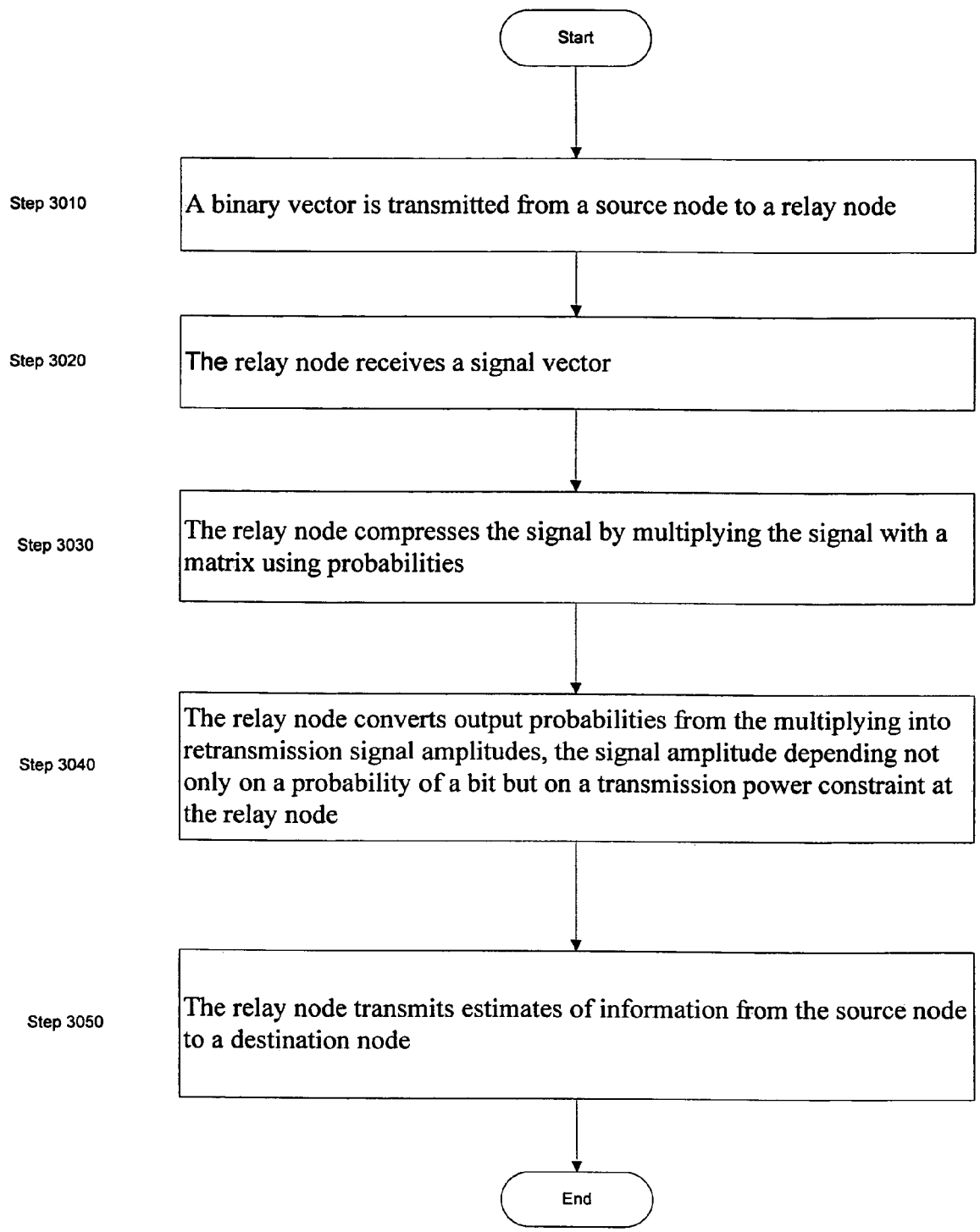
FIG. 3 illustrates steps implemented in an embodiment of the present invention.

FIG. 3 illustrates steps implemented in an embodiment of the present invention. In Step 3010, a binary vector is transmitted from a source node to a relay node. In Step 3020, the relay node receives a signal vector. In Step 3030, the relay node compresses the signal by multiplying the signal with a matrix using probabilities. In Step 3040, the relay node converts output probabilities from the multiplying into retransmission signal amplitudes, the signal amplitude depending not only on a probability of a bit but on a transmission power constraint at the relay node. In Step 3050, the relay node transmits estimates of information from the source node to a destination node.

Figure 4:
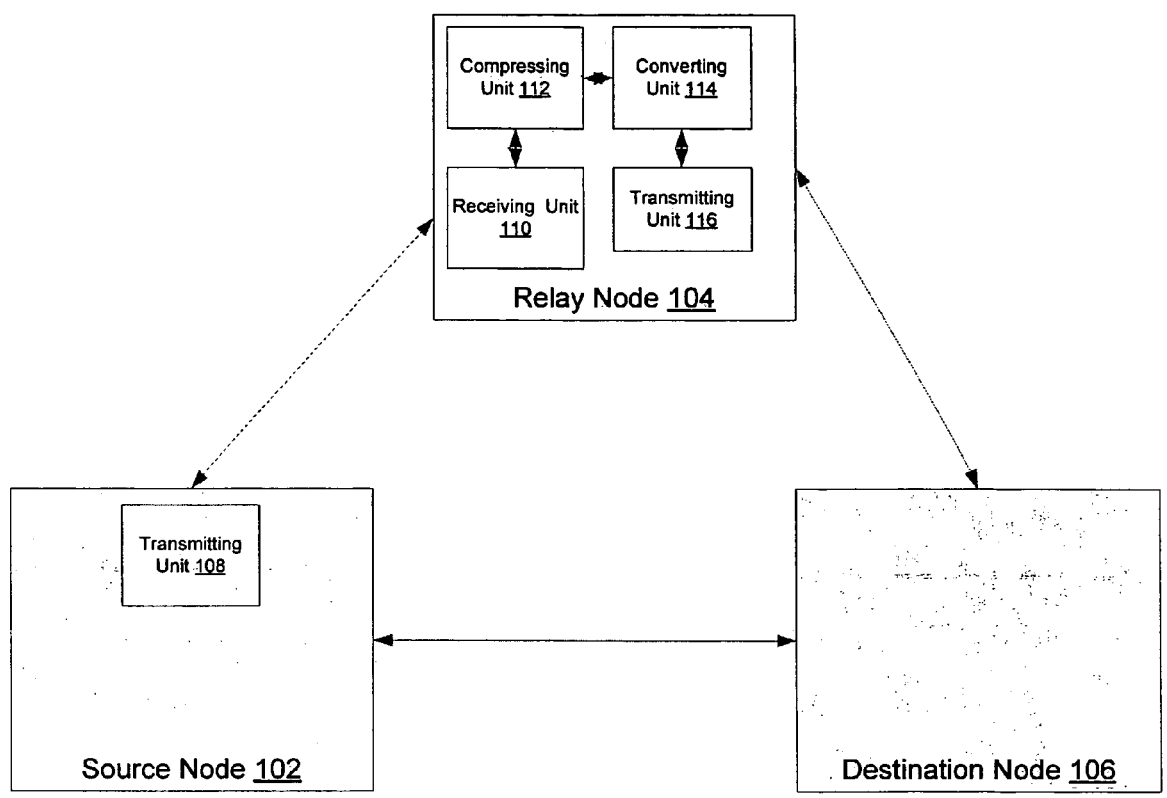
FIG. 4 illustrates a system for implementing an embodiment of the invention.

FIG. 4 illustrates a system for implementing an embodiment of the invention. In the system, source node 102 includes a transmitting unit 108 configured to transmit a binary vector from source node 102 to relay node 104. Relay node 104 includes a receiving unit 110 configured to receive a signal vector, a compressing unit 112 configured to compress the signal by multiplying the signal with a matrix using probabilities, a converting unit 114 configured to convert output probabilities from the multiplying into retransmission signal amplitudes, the signal amplitudes depending not only on a probability of a bit but on a transmission power constraint at the relay node and a transmitting unit 116 configured to transmit estimates of information from source node 102 to destination node 106.

It should be appreciated by one skilled in art that the present invention may be utilized in any device that implements relaying at an intermediate node. The present invention may be implemented in systems, such as in 3.9G long term evolution systems. The foregoing description has been directed to specific embodiments of this invention. It will be apparent however, that other variations and modifications may be made to the described embodiments, with the attainment of some or all of their advantages. Therefore, it is the object of the appended claims to cover all such variations and modifications as come within the true spirit and scope of the invention.

What is claimed:

1. A method, comprising:
receiving a signal vector at a relay node;
compressing, at the relay node, the signal vector by multiplying the signal vector with a matrix using posteriori probabilities as input to the matrix, wherein compression at the relay node is performed without decoding the received signal vector;
converting, at the relay node, output probabilities obtained from the multiplying into retransmission signal amplitudes, the retransmission signal amplitudes depending on an output probability of a bit obtained from the multiplying and a transmission power constraint at the relay node; and
transmitting, by the relay node, the retransmission signal amplitudes representing estimates of information.

2. The method of claim 1, wherein receiving the signal vector further comprises receiving the signal vector in as $Y=[y_1 y_2 \ldots y_m]^T$, where $y_i = x_i + n_i$, $i=1, 2, \ldots m$, and wherein $n_i$ represents additive noise.

3. The method of claim 1, wherein compressing the signal vector further comprises generating a signal $W=[w_1 w_2 \ldots w_k]^T$, for a value k.

4. The method of claim 1, wherein compressing the signal vector further comprises defining a set of column positions that have a 1 in the $j^{th}$ row of the matrix, wherein an output probability is the probability that the $j^{th}$ output bit will be 1 based on the input probabilities and wherein a dependence of the input probabilities on channel outputs is characterized and a dependence of the output probability on the values of the input probabilities is characterized.

5. A method comprising:

receiving a signal vector at a relay node;

compressing, at the relay node, the signal vector by multiplying the signal vector with a matrix using posteriori probabilities as input to the matrix, wherein compression is performed without decoding the received signal vector;

converting output probabilities obtained from the multiplying into retransmission signal amplitudes, the retransmission signal amplitudes depending on at least an output probability and a transmission power constraint at the relay node, the retransmission signal amplitudes determined based on the following equation:

$$w_j = \frac{\delta_r^2}{2} \ln\left(\frac{1}{v_j} - 1\right),$$

wherein $w_j$ represents at least one of the retransmission signal amplitudes, $v_j$ represents at least one of the output probabilities, $\delta$ represents the transmission power of the retransmitted signal amplitudes, and j represents a quantity of the retransmission signal amplitudes; and transmitting, by the relay node, at least one of the retransmission signal amplitudes.

6. An apparatus, comprising:

a receiver configured to receive a signal vector at the apparatus;

a compressor configured to compress the signal vector at the apparatus by multiplying the signal vector with a matrix using posteriori probabilities as input to the matrix, wherein compression at the apparatus is performed without decoding the received signal vector;

a converter configured to convert, at the apparatus, output probabilities obtained from the multiplying into retransmission signal amplitudes, the retransmission signal amplitudes depending on an output probability of a bit obtained from the multiplying and a transmission power constraint at the apparatus; and a transmitter configured to transmit, by the apparatus, the retransmission signal amplitudes representing estimates of information.

7. The apparatus of claim 6, wherein the receiver is further configured to receive the signal vector in as $Y=[y_1 y_2 \ldots y_m]^T$, where $y_i = x_i + n_i$, $i=1,2,\ldots m$, and wherein $n_i$ represents additive noise.

8. The apparatus of claim 6, wherein the compressor is further configured to generate a signal $W=[w_1 w_2 \ldots w_k]^T$, for a value k.

9. The apparatus of claim 6, wherein the compressor is further configured to define a set of column positions that have a 1 in the $j^{th}$ row of the matrix, wherein an output probability is the probability that the $j^{th}$ output bit will be 1 based on the input probabilities and wherein a dependence of the input probabilities on channel outputs is characterized and a dependence of the output probability on the values of the input probabilities is characterized.

10. An apparatus, comprising:

receiving means for receiving a signal vector at the apparatus;

compressing means for compressing the signal vector at the apparatus by multiplying the signal vector with a matrix using posteriori probabilities as input to the matrix, wherein compression at the apparatus is performed without decoding the received signal vector;

converting means for converting, at the apparatus, output probabilities obtained from the multiplying into retransmission signal amplitudes, the signal amplitude depending on an output probability of a bit obtained from the multiplying and a transmission power constraint at the apparatus; and transmitting means for transmitting, by the apparatus, the retransmission signal amplitudes representing estimates of information.

11. A relay node, comprising:

a receiving unit configured to receive a signal vector from a source node;

a compressing unit configured to compress the signal vector by multiplying the signal vector with a matrix using posteriori probabilities as input to the matrix, wherein compression at the relay node is performed without decoding the received signal vector;

a converting unit configured to convert output probabilities obtained from the multiplying into retransmission signal amplitudes, the retransmission signal amplitudes depending on an output probability of a bit obtained from the multiplying and a transmission power constraint at the relay node; and a transmitting unit configured to transmit the retransmission signal amplitudes representing estimates of information.

12. The relay node of claim 11, wherein the receiving unit is further configured to receive the signal vector in as $Y=[y_1 y_2 \ldots y_m]^T$, where $y_i = x_i + n_i$, $i=1,2,\ldots m$, and wherein $n_i$ represents additive noise, wherein the compressing unit compresses without decoding the received signal vector.

13. The relay node of claim 11, wherein the compressing unit is further configured to generate a signal $W=[w_1 w_2 \ldots w_k]^T$, for a value k.

14. The relay node of claim 11, wherein the compressing unit is further configured to define a set of column positions that have a 1 in the $j^{th}$ row of the matrix, wherein an output probability is the probability that the $j^{th}$ output bit will be 1 based on the input probabilities and wherein a dependence of the input probabilities on channel outputs is characterized and a dependence of the output probability on the values of the input probabilities is characterized.

* * * * *